United States Patent Office 3,218,161
Patented Nov. 16, 1965

3,218,161
PROCESS FOR THE PRECIPITATION OF
METAL VALUES FROM SOLUTIONS
Vasyl Kunda, Reginald Francis Pearce, and Vladimir
Nicolaus Mackiw, all of Fort Saskatchewan, Alberta,
Canada, assignors to Sherritt Gordon Mines Limited,
Toronto, Ontario, Canada, a company of Canada
No Drawing. Filed Feb. 27, 1961, Ser. No. 91,632
6 Claims. (Cl. 75—108)

This invention relates to a method of precipitating values of metals which form insoluble sulphides more readily than nickel in acid and neutral solutions having a pH value within the range of from pH 1 to pH 7. The invention is particularly directed to the treatment of such solutions which contain dissolved salts of at least one of the metals of the group consisting of nickel and cobalt and values of at least one other metal which forms an insoluble sulphide more readily than nickel when reacted with hydrogen sulphide.

Hydrometallurgical processes for the extraction and recovery of metals such as nickel, copper and cobalt are becoming relatively well known in the metallurgical and chemical arts and are being employed successfully on a commercial scale. Such processes involve leaching the mineral sulphides with an acid, neutral or alkaline leach solution, preferably at elevated temperature and pressure, in the presence of a free oxygen bearing gas, such as air, oxygen enriched air or oxygen. The resulting leach solution, which contains dissolved salts of the metal or metals of interest, is then subjected to treatment for the recovery of desired metal values as product metal or metals substantially free from impurities.

Metal values, the sulphides of which are of lower solubility in alkline solution than nickel sulphide, can be precipitated from the solution by known processes. For example, if the alkaline solution contains oxidizable sulphur compounds such as polythionate compounds having more than two sulphur atoms in their molecular structure and/or thiosulphate, lower solubility sulphide compounds can be precipitated by heating the solution as disclosed in United States Patents Nos. 2,693,404 and 2,693,405, issued November 2, 1954.

If the alkaline solution is deficient in oxidizable sulphur compounds, it can be treated by the process disclosed in United States application No. 798,597, filed March 11, 1959, now Patent No. 3,088,803 issued Aug. 7, 1963. By this latter process, the alkline solution is treaded with finely divided elemental sulphur particles to effect precipitation of the lower solubility metal sulphides. For example, by these processes the copper content of alkaline solutions which contain dissolved salts of copper, nickel and cobalt can be reduced to as low as 0.0008 gram of copper per litre with only incidental co-precipitation of nickel and cobalt values.

It has been found, however, that known processes for the precipitation of copper values and values of other lower solubility metals from alkaline solutions which contain dissolved salts of nickel and/or cobalt are not satisfactory for the treatment of aqueous solutions having a pH value within the range of from about pH 1 to about pH 7. Heretofore, it has been necessary to precipitate copper and other metals which form insoluble sulphides more readily than nickel when reacted with hydrogen sulphide in an aqueous solution having a pH value of from pH 1 to pH 7 by reaction with a reducing gas such as hydrogen, or by a replacement reaction, such as by the addition of nickel or cobalt to the solution. An alternative procedure is to react the aqueous acid solutions with hydrogen sulphide when the copper and other metals are to be precipitated as metal sulphides. These known methods have the disadvantages that they require expensive reagents or they do not precipitate the copper and other metals from the solutions to the desired extent without the co-precipitation of excessive amounts of desired nickel or cobalt values. These disadvantages result in loss of desired nickel and/or cobalt values from the solution and the presence in the precipitated sulphides of nickel and/or cobalt in amounts which make the treatment of the precipitate difficult and costly for the recovery of the contained metal values.

We have found metal values which form sulphides more readily than nickle and cobalt can be precipitated substantially completely from an aqueous solution having a pH value within the range of from about pH 1 to about pH 7 with co-precipitation of only a very small amount of nickel and/or cobalt values by treating the solution in an inert or a substantially inert atmosphere with finely divided elemental sulphur particles and sulphur dioxide gas in amount sufficient to provide a total elemental sulphur content at least equivalent to, and preferably in slight excess of, the amount required to combine with the metals to be precipitated as metal sulphides.

The method of the present invention is described in detail hereinafter as employed in the treatment of an aqueous solution which contains the dissolved salts of nickel and/or cobalt and copper for the precipitation therefrom of copper as copper sulphide. It will be understood that the method is equally effective in separating from such solution values of other metals which may be present in the solution as dissolved salts and which form insoluble sulphides more readily than nickel in an aqueous solution having a pH value within the range of from about pH 1 to about pH 7. Such other metals include, but are not necessarily limited to, silver, copper, tungsten, bismuth, platinum, cadmium, rhodium, molybdenum, tin, vanadium, mercury, palladium, arseinc, lead, and antimony.

The method of this invention for separating values of metals which form insoluble sulphides more readily than nickel in aqueous solutions having a pH value within the range of from about pH 1 to about pH 7 and which contain, in solution, at least one salt of a metal selected from the group consisting of nickel and cobalt, and a salt of at least one metal which forms an insoluble sulphide more readily than nickel in the said solution, comprises, in general, the steps of adjusting, if necessary, the pH value of the solution to between about 1 and 7, providing in the solution sulphur dioxide and finely divided particles of elemental sulphur in at least the stoichiometric equivalent of the sulphur required to combine with the metal values to be precipitated from the solution as sulphides, actively agitating the solution in an inert atmosphere at a temperature above about 125° F., continuing the treatment to form and precipitate said metal sulphides, and separating precipitated metal sulphides from the solution.

The sulphur dioxide can be, if desired, formed in situ in the solution by adding to the solution a soluble metal sulphite, such as ammonium sulphite or sodium sulphite, in amount sufficient to provide, on decomposition, the desired concentration of sulphur dioxide.

The following examples illustrate the operation of the method of this invention. The solutions treated in these examples were derived by leaching nickel, copper and cobalt mineral sulphides with an aqueous sulphuric acid leach solution in the presence of a free oxygen containing gas. Leaching was conducted at above atmospheric temperature, preferably from about 200° to 300° F. and under a partial pressure of oxygen above about 10 pounds per square inch. Leaching was continued, preferably at a pH value within the range of from about 0.1 to about 2.5, until optimum extraction of desired metal values was obtained. Nickel, copper and cobalt values were oxidized to their divalent state and dissolved in the leach solution as soluble sulphates. Undissolved residue was separated from the solution, such as by filtration. The pH value of the solution was adjusted to between pH 1 and pH 7 by the addition of ammonia. In the following examples, the abbreviation g.p.l. means grams per litre and all percentages are by weight unless otherwise noted.

EXAMPLE 1

Example 1 illustrates the effect of the pH of the solution on the precipitation of copper from an aqueous solution containing nickel, cobalt and copper. To the acid solution of sulphates of these metals, various quantities of ammonia were added to adjust the pH to various values. The copper was removed using sulphur and sulphur dioxide under the following conditions:

Initial solution composition

Grams per litre
Ni ------------------------------------------- 65
Cu ------------------------------------------- 6.26
Co ------------------------------------------- 1.6
$(NH_4)_2SO_4$ ------------------------------- Nil

Additions $SO_2$ ---------------------------grams per litre-- 10
Elemental sulphur to copper molar ratio ------- 1.44:1
Temperature ---------------------------° F-- 212
Retention time ---------------------minutes-- 60

The results of the copper removal experimental series are given in Table 1.

EXAMPLE 2

Example 2 illustrates the effect of varying the amount of sulphur dioxide with other operating conditions varying as shown.

Initial solution composition

Grams per litre
Ni ------------------------------------------- 65
Cu ------------------------------------------- 6
Co ------------------------------------------- 1.6
$(NH_4)_2SO_4$ ------------------------------- Nil

Additions

Sulphur dioxide ----------- grams per litre-- 3.4–10.3
Temperature ---------------------------° F-- 212
Elemental sulphur to copper molar ratio ------ 1.44:1

The results obtained in this series of experiments are set out in Table 2.

TABLE 2

[Analyses of solutions and copper sulphide residues in experiments carried out at various sulphur dioxide additions]

| Experiment No. | Retention Time (Min.) | $SO_2$ Added, gpl. | $NH_3$ Added, gpl. | Initial Cu, gpl. | Final Cu, gpl. | $SO_2$, gpl. | pH | Cu-Sulphide Residue, percent | | |
|---|---|---|---|---|---|---|---|---|---|---|
| | | | | | | | | Cu | S | Ni |
| 1 | 30 | 3.4 | 9.5 | 6.0 | 1.78 | 0.09 | 3.0 | 40.4 | 33.8 | 0.21 |
| 2 | 30 | 7.0 | 19.5 | 6.0 | 0.71 | 0.1 | 4.9 | 46.8 | 42.0 | 0.98 |
| 3 | 30 | 8.7 | 22.0 | 6.0 | 0.018 | 0.1 | 4.6 | 45.4 | 44.2 | 0.71 |
| 4 | 30 | 10.3 | 29.5 | 6.0 | 0.001 | 1.0 | 5.2 | 47.9 | 40.2 | 1.2 |

The results set out in Table 2 illustrate the necessity of providing sufficient sulphur dioxide. The addition of about 8.7 grams per litre sulphur dioxide effectively reduced the copper content from 6 grams per litre to less than 0.02 gram per litre. By increasing the sulphur dioxide addition to 10 grams per litre, the final copper content of the solution was reduced to 0.001 gram per litre.

EXAMPLE 3

This example illustrates the effect of varying the ammonium sulphate content of the solution, other conditions being maintained constant.

Initial solution composition

Grams per litre
Ni ------------------------------------------- 65
Cu ------------------------------------------- 6
Co ------------------------------------------- 1.6
$(NH_4)_2SO_4$ ------------------------------- 0 to 100

Additions

Sulphur dioxide --------------grams per litre-- 8.6
Temperature ---------------------------° F-- 212
Elemental sulphur to copper molar ratio ------- 1.44:1

TABLE 1

| $NH_3$ Add., gpl. | $NH_3$ excess or deficiency percent | pH | | | Strip Solution | | pH | Strip Residue | | |
|---|---|---|---|---|---|---|---|---|---|---|
| | | Original | After $NH_3$ add. | After $NH_3$ +$SO_2$ add. | Cu, gpl. | $SO_2$, gpl. | | Cu | S | Ni |
| Nil | −100 | 2.8 | -------- | 1.3 | 0.0025 | 0.2 | 0.8 | 61.8 | 37.8 | 0.2 |
| 3.3 | −45.5 | 2.8 | 5.7 | 3.1 | 0.0008 | 0.3 | 1.1 | 48.0 | 41.9 | 0.03 |
| 6.6 | +9.5 | 2.8 | 6.6 | 4.6 | 0.0006 | 2.2 | 2.0 | 52.2 | 42.7 | 1.34 |
| 9.9 | +64.0 | 2.8 | 6.9 | 5.9 | 0.0060 | 7.3 | 6.1 | 52.2 | 35.6 | 0.2 |
| 13.2 | +90.5 | 2.8 | 7.6 | 7.1 | 0.0055 | 8.2 | 6.6 | 47.7 | 33.6 | 1.8 |

Note.—The "ammonia excess or deficiency" is defined as a percentage of the theoretical ammonia required to provide one mol of ammonia per mol of sulphur dioxide plus two mols of ammonia per mol of copper. The results in Table 1 show that the copper can be substantially removed by the addition of sulphur and sulphur dioxide at any pH in the range from pH 1 to pH 7.

The results obtained in this series of experiments are set out in Table 3.

TABLE 3

[Analyses of solutions and copper sulphide residues obtained in experiments, carried out on solutions of various ammonium sulphate concentrations]

| Initial $(NH_4)_2SO_4$ Concentration, gpl. | Retention Time (Min.) | $SO_2$ Added, gpl. | $NH_3$ Added, gpl. | Initial Cu, gpl. | Final Cu, gpl. | $SO_2$, gpl. | pH | Cu-sulphide Residue, Percent | | |
|---|---|---|---|---|---|---|---|---|---|---|
| | | | | | | | | Cu | S | Ni |
| 0 | 45 | 8.7 | 5.5 | 6.0 | 0.015 | 0.05 | 4.9 | 46.2 | 44.0 | 1.77 |
| 50 | 45 | 8.7 | 5.5 | 6.0 | 0.02 | 0.09 | 4.7 | 46.1 | 42.0 | 0.51 |
| 100 | 45 | 8.7 | 5.5 | 6.0 | 0.02 | 0.1 | 4.7 | 47.4 | 41.0 | 0.12 |

The addition of ammonium sulphate in the range of 0 to about 100 grams per litre does not materially affect the precipitation of copper sulphide.

EXAMPLE 4

Example 4 illustrates the effect of the amount of elemental sulphur on the precipitation of copper from a nickel and copper containing solution. A constant sulphur dioxide addition was maintained and the addition of elemental sulphur was varied from an elemental sulphur to copper molar ratio from 0 to 2:1.

*Initial solution composition*

Ni _____ 65 grams per litre.
Cu _____ 6 grams per litre.
$(NH_4)_2SO_4$ _____ about 6.0 grams per litre.

*Additions*

Sulphur dioxide _____ 8.7 grams per litre.
Temperature _____ 212 F.
Elemental sulphur to copper molar ratio _____ 0 to 2.0:1.

The results obtained in this series of experiments are set out in Table 4.

The results set out in Table 4 illustrate that an elemental sulphur to copper molar ratio of from 1:1 to 1.5:1 is required to precipitate the copper as copper sulphide with co-precipitation of a minimum amount of nickel.

The absence of elemental sulphur and precipitation by sulphur dioxide alone resulted in the precipitation of only about 66% of the copper after 15 minutes reaction time. The copper precipitated by sulphur dioxide alone appeared in the form of metallic copper powder.

EXAMPLE 5

Example 5 illustrates the effect of varying the operating temperature on the extent of copper precipitation from an aqueous acid nickel-copper solution when treated with elemental sulphur and sulphur dioxide under the following conditions:

*Initial solution composition*

Ni _____ 65 grams per liter.
Cu _____ 18 grams per litre.
$(NH_4)_2SO_4$ _____ None.
Sulphide dioxide addition _____ 20–26 grams per litre.
Temperature _____ 125° F. to 270° F.
Elemental sulphur to copper molar ratio _____ 1.5:1.

The results obtained in this series of experiments are illustrated in Table 5.

TABLE 5
[Effect of temperature on copper removal]

| Temp., ° F. | Time, Min. | $SO_2$, gpl. | Copper, gpl. | |
|---|---|---|---|---|
| | | | Initial | Final |
| 125 | 60 | 26.3 | 18 | 0.060 |
| 150 | 60 | 24.5 | 18 | 0.045 |
| 180 | 45 | 22.8 | 18 | 0.006 |
| 212 | 45 | 21.0 | 18 | 0.002 |
| 270 | 30 | 19.3 | 18 | 0.005 |

TABLE 4
[Effect of varying the elemental sulphur addition on the efficiency of the copper precipitation]

| S°:Cu Molar Ratio | Retention Time (Mins.) | $SO_2$ Added, gpl. | $NH_3$ Added, gpl. | Initial Cu, gpl. | Final Cu, gpl. | $SO_2$ gpl. | pH | Cu-sulphide Residue, percent | | |
|---|---|---|---|---|---|---|---|---|---|---|
| | | | | | | | | Cu | S | Ni |
| 0 | 15 | 8.7 | 6.7 | 6.0 | 2.15 | 5.9 | 3.4 | 90.6 | 2.6 | 1.6 |
| 0.3:1 | 15 | 8.7 | 5.5 | 6.0 | 1.30 | 2.0 | 3.2 | 79.2 | 16.1 | 0.6 |
| 0.5:1 | 15 | 8.7 | 6.1 | 6.0 | 0.60 | 1.9 | 4.3 | 77.5 | 21.2 | 0.3 |
| 1:1 | 15 | 8.7 | 5.5 | 6.0 | 0.045 | 1.8 | 3.1 | 65.8 | 32.8 | 0.2 |
| 1.5:1 | 15 | 8.7 | 5.5 | 6.0 | 0.004 | 1.6 | 2.9 | 63.8 | 34.6 | 0.2 |
| 2:1 | 15 | 8.7 | 5.5 | 6.0 | 0.001 | 5.5 | 4.6 | 52.7 | 44.8 | 0.8 |

The results from this series of tests illustrate that the copper can be precipitated from the solution to 0.006 gram per litre in 45 minutes at 180° F. Increasing the temperature accelerates the reaction rate.

EXAMPLE 6

Example 6 illustrates the effect of the particle size of the elemental sulphur employed on the rate and the completeness of the copper precipitation. A solution having a pH value of 4.5 and which contained 65 grams per litre nickel; 6 grams per litre copper; 6 grams per litre ammonium sulphate was treated with 8.7 grams of sulphur dioxide per litre and elemental sulphur of varying particle size distribution at a molar ratio of elemental sulphur to copper of 1.5:1. The results obtained are set out in Table 6.

TABLE 6

| Time, Min. | Temp., °F. | Particle size (Microns) | Cu in Treated solution, gpl. |
|---|---|---|---|
| 75 | 250 | 208–295 | 0.04 |
| 75 | 250 | 104–147 | 0.002 |
| 20 | 250 | 90% 74–104 | 0.001 |

This example indicates that the best results are obtained when the added elemental sulphur is of a particle size smaller than about 147 microns.

EXAMPLE 7

Example 7 illustrates the advantages of treating the elemental sulphur with a wetting agent prior to the addition of the sulphur to the aqueous acid nickel-copper sulphate solution. A solution having a pH of 4.5 and which contained 65 grams of nickel per litre and 6 grams of copper per litre and to which had been added 8.7 grams of sulphur dioxide per litre, was treated in a series of experiments with elemental sulphur in a sulphur to copper molar ratio of 1:1. In one series the sulphur was added as received and in the second series a few drops of Aerosol OT, an alkyl aryl sodium sulphonate produced by the American Cyanamid Company, were added to the charge. The results obtained are set out below in Table 7.

TABLE 7

| Reaction Time (Minutes) | Copper, gpl. | |
|---|---|---|
| | Untreated Sulphur | Sulphur plus Aerosol OT |
| 0 | 6.0 | 6.0 |
| 5 | 2.3 | 0.9 |
| 15 | 0.76 | 0.005 |
| 30 | 0.007 | <0.001 |

EXAMPLE 8

Example 8 illustrates the precipitation of copper from an aqueous acid solution in which the main non-ferrous metal value is cobalt. A solution having a pH value of 3.3 and containing 48 grams of cobalt per litre and 5 grams of copper per litre, to which had been added 10.4 grams of sulphur dioxide per litre was treated with elemental sulphur at a sulphur to copper molar ratio of 1.5:1 for one hour at 212° F. The copper was precipitated as the results set out in Table 8 show:

TABLE 8

| Time, minutes: | Cu g.p.l. |
|---|---|
| Start | 5.0 |
| At temperature | 0.87 |
| 5 | 0.28 |
| 10 | 0.0047 |
| 20 | 0.0019 |
| 30 | 0.0016 |
| 45 | 0.0014 |
| 60 | 0.0010 |

The precipitated sulphide contained 54.3% Cu, 35.1% S and 0.24% Co illustrating that the cobalt loss was insignificant. The results shown in this example illustrate that the process can be applied also with equally satisfactory results to aqueous acid solutions which contain cobalt.

The method of this invention possesses the important advantage that values of metals, the sulphides of which are of lower solubility than nickel sulphide in solutions having a pH value within the range of from about pH 1 to about pH 7, can be precipitated therefrom substantially completely relatively easily and rapidly as an economically practical operation from a solution which contains dissolved nickel and/or cobalt salts with the co-precipitation of only very small amounts of nickel and/or cobalt.

It will be understood, of course, that modifications can be made in the preferred embodiments of this invention without departing from the scope of the invention as defined by the appended claims.

What we claim as new and desire to protect by Letters Patent of the United States is:

1. The method of selectively precipitating values of at least one metal selected from a first group consisting of silver, copper, tungsten, bismuth, platinum, cadmium, rhodium, molybdenum, tin, vanadium, mercury, palladium, arsenic, lead and antimony from an aqueous sulphate solution which contains, in solution, at least one of said metals and at least one metal of a second group consisting of nickel and cobalt which comprises the steps of reacting said solution at a pH within the range of from about 1 to about 7 with sulphur dioxide and finely divided particles of elemental sulphur, said elemental sulphur provided in amount in excess of the stoichiometric equivalent of sulphur required to combine with said first group metal values in solution to form metal sulphides of said first group, actively agitating the solution in an inert atmosphere at a temperature above about 125° F., continuing the reaction with said sulphur dioxide and finely divided particles of elemental sulphur to form and precipitate said metal sulphides and separating the precipitated metal sulphides from the solution.

2. The method according to claim 1 in which the added elemental sulphur is of a particle size smaller than about 104 microns.

3. The method according to claim 1 in which the reaction is conducted at a temperature above about 180° F.

4. The method according to claim 1 in which the sulphur dioxide is formed in the solution by the addition to the solution of a soluble metal sulphite.

5. The method according to claim 1 in which the sulphur dioxide is formed in the solution by the addition to the solution of a soluble metal sulphite selected from the group consisting of ammonium sulphite and sodium sulphite.

6. The method according to claim 1 in which the metal value to be selectively precipitated is copper and the pH value of the solution is adjusted to within the range of from about pH 1 to about pH 7 prior to the initiation of the reaction with sulphur dioxide and elemental sulphur.

References Cited by the Examiner
UNITED STATES PATENTS

| 1,178,191 | 4/1916 | Sulman et al. | 23—134 |
| 2,352,096 | 6/1944 | Hoy | 23—134 |
| 2,651,562 | 9/1953 | De Merre et al. | 23—134 |
| 2,662,009 | 12/1953 | Roberts et al. | 23—13 X |
| 2,716,588 | 8/1955 | Hall | 23—134 X |
| 2,755,172 | 7/1956 | McGauley et al. | 23—134 |

BENJAMIN HENKIN, *Primary Examiner.*

JAMES H. TAYMAN, Jr., GEORGE D. MITCHELL, MAURICE A. BRINDISI, *Examiners.*